United States Patent
Diasparra et al.

(10) Patent No.: US 11,064,138 B2
(45) Date of Patent: Jul. 13, 2021

(54) HIGH-DYNAMIC IMAGE SENSOR

(71) Applicant: Teledyne e2v Semiconductors SAS, Saint Egreve (FR)

(72) Inventors: Bruno Diasparra, Seyssins (FR); Vincent Richard, Saint Ismier (FR)

(73) Assignee: TELEDYNE E2V SEMICONDUCTORS SAS, Saint Egreve (FR)

( * ) Notice: Subject to any disclaimer, the term of this patent is extended or adjusted under 35 U.S.C. 154(b) by 0 days.

(21) Appl. No.: 16/768,912

(22) PCT Filed: Dec. 6, 2018

(86) PCT No.: PCT/EP2018/083762
§ 371 (c)(1),
(2) Date: Jun. 2, 2020

(87) PCT Pub. No.: WO2019/110718
PCT Pub. Date: Jun. 13, 2019

(65) Prior Publication Data
US 2020/0382728 A1 Dec. 3, 2020

(30) Foreign Application Priority Data

Dec. 7, 2017 (FR) ...................... 17/01285

(51) Int. Cl.
*H04N 5/355* (2011.01)
*H04N 9/04* (2006.01)
(Continued)

(52) U.S. Cl.
CPC ......... *H04N 5/35581* (2013.01); *H04N 5/374* (2013.01); *H04N 5/378* (2013.01); *H04N 9/0455* (2018.08)

(58) Field of Classification Search
CPC .. H04N 5/35581; H04N 9/0455; H04N 5/374; H04N 5/378; H04N 5/37452;
(Continued)

(56) References Cited

U.S. PATENT DOCUMENTS

| 8,405,750 B2 | 3/2013 | Smith et al. |
| 2009/0059048 A1 | 3/2009 | Luo et al. |

(Continued)

OTHER PUBLICATIONS

International Search Report and Written Opinion of the International Searching Authority for PCT/EP2018/083762 dated Feb. 28, 2019.

*Primary Examiner* — Jason A Flohre
(74) *Attorney, Agent, or Firm* — K&L Gates LLP

(57) ABSTRACT

An image sensor includes a pixel structure which pair-wise vertically shares at least one read node, and further comprises a memory node for storing charges. A vertical transfer control line commands charge transfer from the photodiode to the memory node of a given column. The vertical transfer control rows apply two different exposure times, a first to the even columns and a second to the odd columns. The pixels and the read circuit perform one read operation per vertical pair of pixels over the exposure time associated with the column of the pair. A processing block is configured to calculate, for each vertical pair of pixels, an interpolated digital value. A periodic pattern of colored filters creates an HDR-mode color image sensor.

13 Claims, 7 Drawing Sheets

Figure 1:
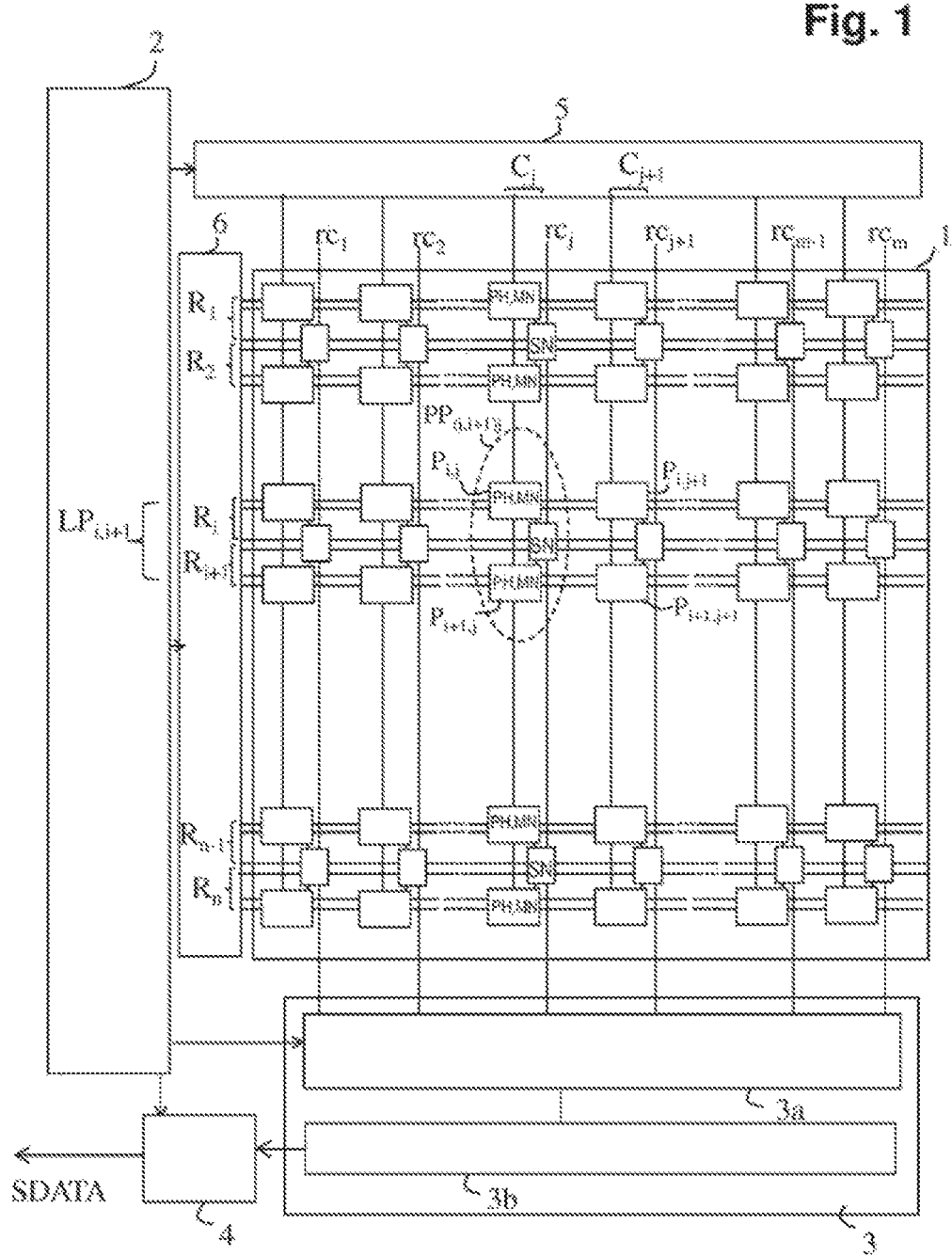

(51) Int. Cl.
*H04N 5/374* (2011.01)
*H04N 5/378* (2011.01)

(58) Field of Classification Search
CPC .. H04N 5/35554; H04N 5/2355; H04N 5/347; H04N 5/37457
See application file for complete search history.

(56) References Cited

U.S. PATENT DOCUMENTS

| | | |
|---|---|---|
| 2009/0135263 A1 | 5/2009 | Sorek et al. |
| 2012/0248290 A1* | 10/2012 | Kamiyama ........ H04N 5/37452 250/208.1 |
| 2013/0057743 A1 | 3/2013 | Minagawa et al. |
| 2014/0092285 A1 | 4/2014 | Moriyama et al. |
| 2015/0076323 A1* | 3/2015 | Mabuchi ............ H04N 5/37213 250/208.1 |
| 2015/0312461 A1 | 10/2015 | Kim et al. |
| 2016/0173797 A1* | 6/2016 | Minowa ............. H04N 5/37452 348/297 |
| 2017/0078606 A1* | 3/2017 | Ohmaru ............... H04N 5/3575 |
| 2017/0084649 A1* | 3/2017 | Ohmaru ............... H04N 5/3532 |

\* cited by examiner

HIGH-DYNAMIC IMAGE SENSOR

PRIORITY

This application is a U.S. National Stage Entry under 35 U.S.C. § 371 of International Application No. PCT/EP2018/083762, entitled HIGH-DYNAMIC IMAGE SENSOR, filed Dec. 6, 2018, which further claims priority to French Application serial number 17/01285 filed Dec. 7, 2017, the contents of all of which are incorporated herein by reference in their entirety and for all purposes.

TECHNICAL FIELD

The present invention relates to image sensors with active pixels (pixel structure with photosensitive element and control transistors) which make it possible to supply an image with high output dynamics, which is particularly desirable when the scene of which one wishes to make an image is high-contrast.

PRIOR ART

The dynamics of an image sensor reflect its ability to simultaneously sense in the same image an unsaturated signal in zones with very high lighting and a significant signal (higher than the noise) in zones with low lighting, Said dynamics depend intrinsically on the structure of the pixels (electric wiring diagram and technology) and the properties of the pixel read circuits (gain, read noise, output depth of the converter) of the sensor in consideration. Under the high-contrast exposure conditions of a scene, the intrinsic limits of the dynamics of the sensor are reflected in a loss of information: if the exposure time is short, saturation does not occur rapidly, while in dark zones, the signal is too weak compared to the noise of the read sequence of the sensor. If the exposure time is long, the pixel will be saturated in the zones with very high lighting. This loss of information is critical for certain applications, such as the applications of industrial vision, intelligent traffic (ITS) or electronic inspection to mention only a few.

To meet this demand, in parallel with research on the technology and the structures, so-called "HDR" (for "High Dynamic Range") imaging techniques have been proposed in order to extend the dynamics of the sensors (both CCD and CMOS). This involved taking at least two images of a scene, successively, each with a different exposure time of the pixels, and then combining these two images to form a single image by applying image reconstruction algorithms making it possible to obtain an output image containing all the details of the scene both in zones with very high exposure to light and in zones with very low exposure.

However, the HDR output images obtained can contain artifacts (distortions, blurriness) due to the fact that the combined images for producing the output HCR image were not taken at the same time. Thus, there can be an effect due to motion which deteriorates the image rendering and thus the use of the image by the application in question. But above all, this technique has a very negative effect on the frame rate (number of image/s) at the output of the sensor and requires integrating a large memory capacity in the sensor, since at least two successive images have to be acquired and stored in memory in order to reconstruct and supply an HDR output image.

To solve these problems of response time and memory, it has been proposed to apply interlacing and interpolation techniques so as to obtain, during the same image sensing, information corresponding to (at least) two different exposure times, using the control and addressing possibilities of the active pixels (CMOS sensors). Using the example of two different exposure times, the principle is as follows: a single image sensing operation is carried out applying the first exposure time to some rows and the second exposure time to other rows, in an interlaced or alternating manner. This interlaced distribution of the exposure times over the rows of the matrix enables processing by interpolation, for the purpose of obtaining two information items per pixel corresponding to the two exposure times, one corresponding to the read value and which corresponds to the exposure time of the pixel, and the other corresponding to a value interpolated from the read values of pixels of neighboring rows exposed for another exposure time. This is what makes it possible to reconstruct HDR data by retaining the best information for each pixel (read value or interpolated value) with scaling if applicable. For example, if one uses the shorter exposure time, the read or interpolated values corresponding to the longer exposure time will be divided by the ratio of the longer time to the shorter time ("resealing"). In the end, there is a slight loss of resolution due to the interpolation but a gain in frame rate. For example, the U.S. Pat. No. 8,405,750 (Smith et al.) describes an HDR imaging technique for CMOS sensor based on this principle and which is suitable for instantaneous image sensing (global shutter) which in fact reduces the artifacts due to motion: in the shared integration phase, the pixels integrate all at the same time but for varying durations, depending on the row on which they are located; then, in the read phase, the rows are read one by one, successively. The production of each HDR output image row is carried out based on data from only a few rows of a single image sensing, reducing the memory capacity that makes it possible to perform the interpolation calculations to a few rows of the matrix (in comparison with a technique requiring the storage of two complete images). The patent considers different scenarios of control of the rows of the pixels for achieving the interlacing of the different exposure times on the rows, using the command to initialize the pixels and/or the command to transfer the charges integrated by the pixel to a read node of the pixel. This HDR imaging technique which is suitable for an instantaneous sensing mode is thus more rapid, more economical in terms of memory capacity and has a better yield in terms of artifacts.

The application US 2009/0059048 proposes an additional way of improving the response time, by reducing the number of rows of the output image: the raw data of N successive rows of pixels covering N different exposure times is combined to form the "HDR" data of one (1) row of pixels of the final image. The HDR image obtained is N times less vertically resolved (spatial resolution) than the image sensed by the sensor which has the size of the matrix of pixels (of the imager).

Moreover, since the vision applications are looking for the best signal-to-noise ratio, it is preferable to be able to carry out a reading of the pixels by the well-known technique referred to as CDS (correlated double sampling) which makes it possible to eliminate the random read noise by subtracting the zero level of the read node from the signal level. It is well known that this CDS read technique is directly applicable to the CMOS pixel structures, when the image sensing has an electronic rolling shutter (rolling shutter). However, in that case, there are again possible image artifacts in case of movement. The instantaneous sensing technique, with electronic global shutter (global shutter) makes it possible to avoid these artifacts. On the other hand, it requires a more complex pixel structure, with a memory node in addition to the read node, if one wishes to make the reading less noisy, CDS. This then results in a loss in terms of compactness and pixel aperture ratio.

Finally, with regard to color management, the described HDR imaging technologies are compatible with the various formats of arrays of colored filters integrated in the color image sensors, and the above-cited patents US2009/0059048 and U.S. Pat. No. 8,405,750 explain this in detail. However, the memory capacity needs are increased, since the interpolation calculation for a given pixel must take into account the distribution of the colors of filters over the matrix of pixels in order to make it possible to construct HDR information consistent with the color of the processed pixel, Using the example of an array of colored filters deposited on the matrix of pixels and including the periodic repetition of a pattern of four colored filters covering a block of 2×2 pixels (Bayer filter, but also CYGM, RGBE, filter etc. using the English notation), and of an alternation of two exposure times (short, long) every other row: the raw data of at least five successive rows of pixels is then necessary (and thus has to be stored in memory) in order to reconstruct (by interpolation or recombination) for each output pixel the HDR information in the right color.

Technical Problem

The market of industrial vision applications (sorting and inspection on a production line) is looking for compact vision systems which simultaneously offer good resolution, with large high measurement dynamics, with a rapid response time and few or no artifacts, because this contributes to reducing the overall production costs.

The HDR imaging techniques of the prior art do not make it possible to properly meet these needs. In particular, it has been seen that they require an excessively large memory capacity of several image rows for the interpolation calculation, which is inconsistent with the required compactness.

In addition, since it is desirable to reduce to the maximum extent the problems of artifacts due to motion, it would be desirable to be able to use an instantaneous sensing mode. However, since it is just as desirable to use the CDS read technique in order to reduce the noise component, the structure of the pixels is then not advantageous in terms of size and aperture ratio. Structures of pixels with shared elements make it possible to improve these two aspects but this increases the complexity of the management of the sequencing signals for obtaining an HDR image according to the techniques of the prior art. The management of the color adds additional complexity to all these different aspects.

SUMMARY OF THE INVENTION

An object of the invention is a CMOS sensor with high-dynamic reconstruction integrated at low cost (complexity, size), with optimized frame rate, and also suitable for color image sensing.

The underlying solution of the invention results from research aiming to optimize both the pixel structure and the control sequences of the pixels in order to reconcile the different constraints, by combining structures of shared pixels with layouts of associated control signals, enabling an ingenious use of the operation of the read circuit, sequenced by row of pixels, with one read channel per column, in order to apply a horizontal HDR interpolation and reconstruction, by row, making it possible to avoid the row memories of the prior art. The pixel structure and the arrangement of the signals according to the invention make it possible to drive the control signals of the pixels and the read circuit in order to carry out image sensing with global shutter with two exposure times, one on the even columns and the other on the odd columns, and a reading and utilization of the data in order to reconstruct high-dynamic values in-line, at the rate of the column address decoder which drives the read circuit. A very compact sensor is obtained, with a high-performance high-dynamic mode, having, in particular, a better signal-to-noise ratio of the output data as a result of a grouping of pixels by vertical pairs during the read phase, performing an analog summing of charges in the shared read node and an output frame rate which is improved by a factor of two, as a result of the reading of every other row, which corresponds to the reading of the shared read nodes in each pair of rows.

This HDR reconstruction with grouping of pixels by vertical pair is very advantageously combined with a sensing of the color, by means of an array of colored filters including one colored filter per pixel of the matrix, with the same filter color per block of 2×2 pixels, forming two vertical pairs of aligned pixels, the pixels of one integrating even columns during the exposure time and the pixels of the other integrating odd columns during the exposure time. Benefit is drawn from the transfer time which is improved by the ratio of 2, and from the better signal-to-noise ratio (analog summing in each pair), without alteration of the field of vision of the sensor (the actual imaged actual area does not vary).

The transmission rate is improved by providing in each pair of rows an additional horizontal grouping, by vertical pairs of pixels having the same color, in pairs, establishing a high-dynamic output value, by digital addition, for each block of pixels representing two successive vertical pairs of pixels. Then, one obtains a conventional quadruplet of color information of the Bayer type, which is processed easily at reduced cost (memory, processing time) by the color processing algorithms of the prior art.

The invention thus relates to an image sensor with active pixels comprising a matrix of pixels arranged in rows and columns, wherein the rows define a horizontal alignment of pixels and the columns define a vertical alignment of pixels; a read circuit comprising one separate read channel per column of pixels and configured so as to establish by analog to digital conversion a digital value representative of the quantity of charges integrated by a pixel during an exposure time of the pixel, and to successively supply at the output said digital values established in each read channel for each row of the matrix; a digital processing block configured so as to apply digital processing operations to said digital values supplied at the output by the read circuit. Each pixel on a respective row and column of the matrix includes a photodiode, a memory node and a read node, and:
- a first reinitialization transistor configured so as to selectively reinitialize the photodiode,
- a second reinitialization transistor configured so as to selectively reinitialize the read node,
- a first transfer transistor for selectively authorizing the transfer of the electrical charges integrated by the photodiode, into the memory node,
- a second transfer transistor for selectively authorizing the transfer of charges stored in the memory node, into the read node,
- a transistor mounted as voltage follower and configured so as to selectively apply the voltage to the terminals of the read node on the read channel ($rc_j$) of the column of the pixel, when the row of the pixel is read selected.

The sensor is such that in each column of pixels, the read node, the reinitialization transistor of the read node and the transistor mounted as voltage follower are shared vertically by at least two successive pixels in the column; the first and second reinitialization transistors and the second transfer transistor are each driven by a respective control signal shared by all the pixels of a given row, and the first transfer transistor is driven by a control signal shared by all the pixels of a given column of pixels. And the sensor also includes a controller configured so as to drive the transistors of the pixels, the read circuit and the digital processing block in order to control image sensing with global shutter in high-dynamic mode comprising:

an integration phase with global shutter including a global exposure of the pixels of the odd columns during a first integration time which starts after a global reinitialization of the photodiodes of the matrix and which ends simultaneously for all the pixels of the odd columns, with a first global transfer of charges from the photodiodes to the memory mode of said pixels; and a global exposure of the pixels of the even columns during a second integration time different from the first one, which starts after a global reinitialization of the photodiodes of the matrix and which ends simultaneously for all the pixels of the even columns, with a first global transfer of charges from the photodiode to the memory node of said pixels, and then a sequential read phase, by pair of rows, the pixels of a pair of rows located on a given column forming, in pairs, a vertical pair of pixels with shared read node, and said read phase is such that a read sequence of a pair of rows includes for each vertical pair of pixels the steps of:

establishing a first digital value by the read circuit (2), which is a measure of the analog sum of the charges integrated by each of the pixels of said vertical pair of pixels during the exposure time of the respective column, then establishing a second digital value corresponding to the other exposure time, by horizontal interpolation by the digital processing block of first digital values established in the read sequence of the current pair of rows, for at least two vertical pairs of pixels on neighboring columns, on both sides of the column of the vertical pair of pixels in consideration, wherein said neighboring columns are associated with said other exposure time, and establishing a high-dynamic output value for said vertical pair of pixels from said first digital value, which is read, and said second digital value, which is interpolated, by comparison with at least one first threshold.

According to an aspect of the invention, the digital processing block is configured so as to apply an additional operation of horizontal grouping of data in each pair of rows in order to form a high-dynamic image data flow at the output of the sensor. Thus, for each pair of rows, one high-dynamic output value per block of two successive vertical pairs of pixels of the pair of rows is established, said high-dynamic value being based on a digital addition of the two high-dynamic values of the two vertical pairs of pixels of the block.

According to another aspect of the invention, the sensor includes an array of color filters, such that the two pixels of each vertical pair of pixels are associated with the same colored filter color and, advantageously, a color macro-pixel is defined, which is a block of 4 blocks of 2×2 pixels, covering 4 consecutive rows and 4 consecutive columns, each block forming two vertical pairs of pixels, and this macro-pixel is associated with a periodic pattern of 4 colored filters, based on a 2×2 block per filter color of the pattern.

Figure 2:
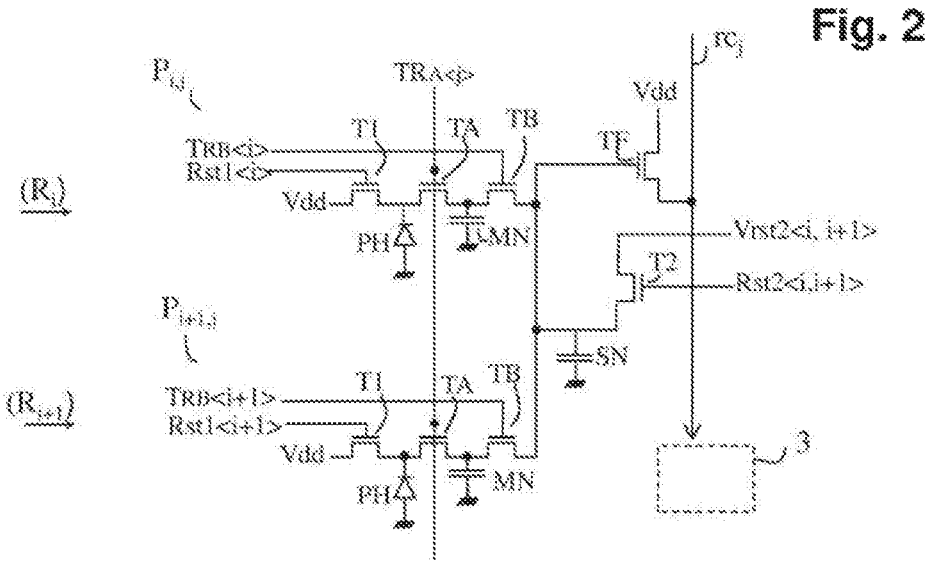
Figure 3:
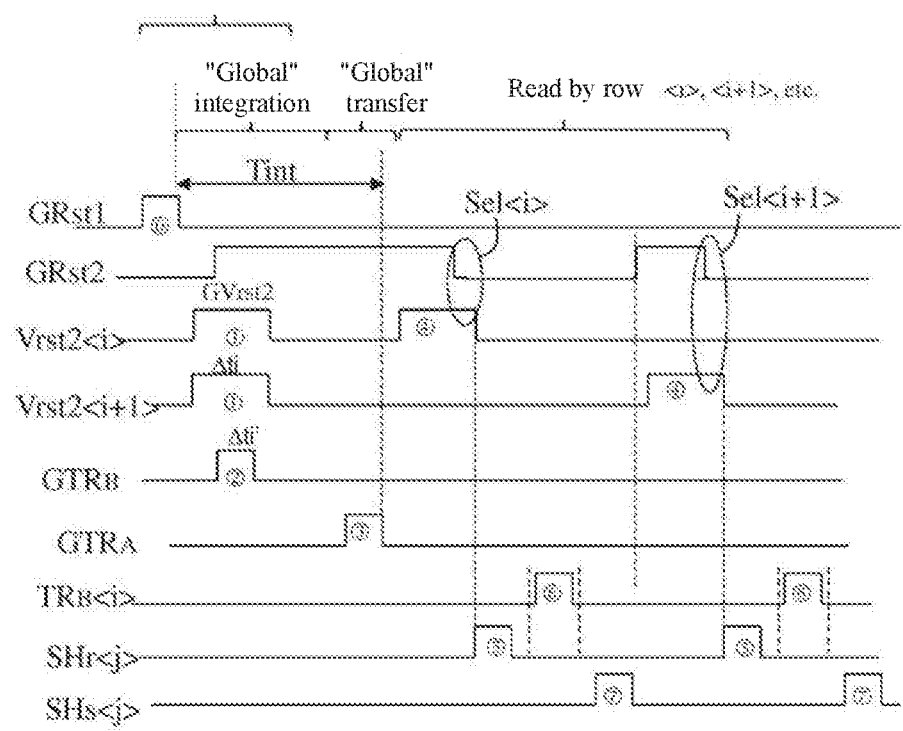
Figure 4:
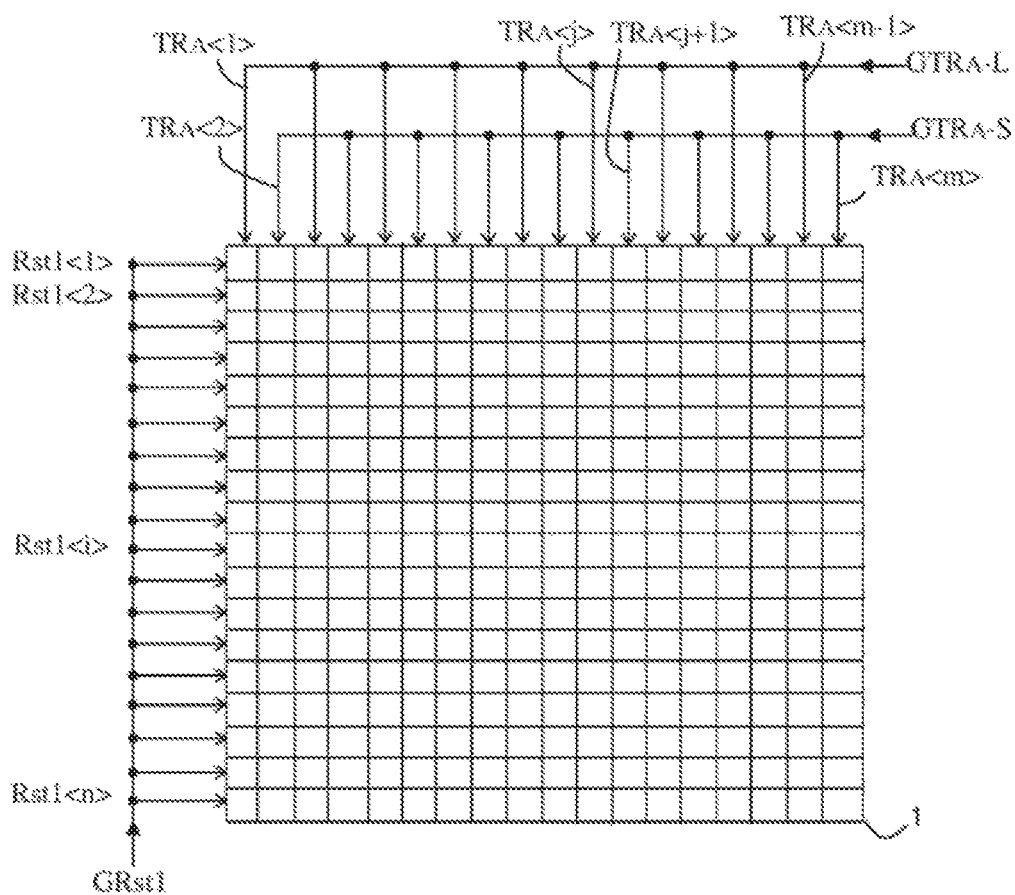
Figure 5:
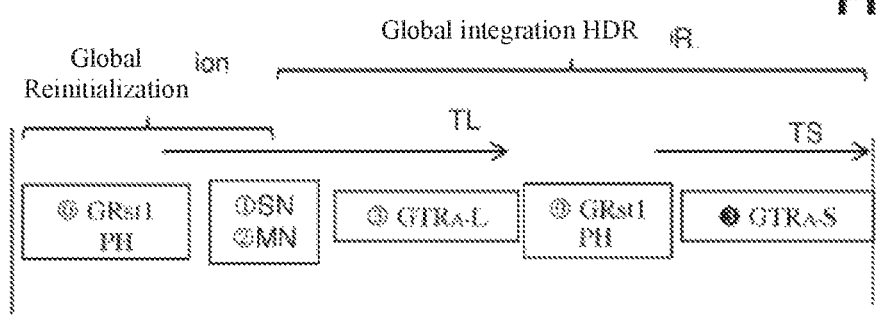
Figure 6:
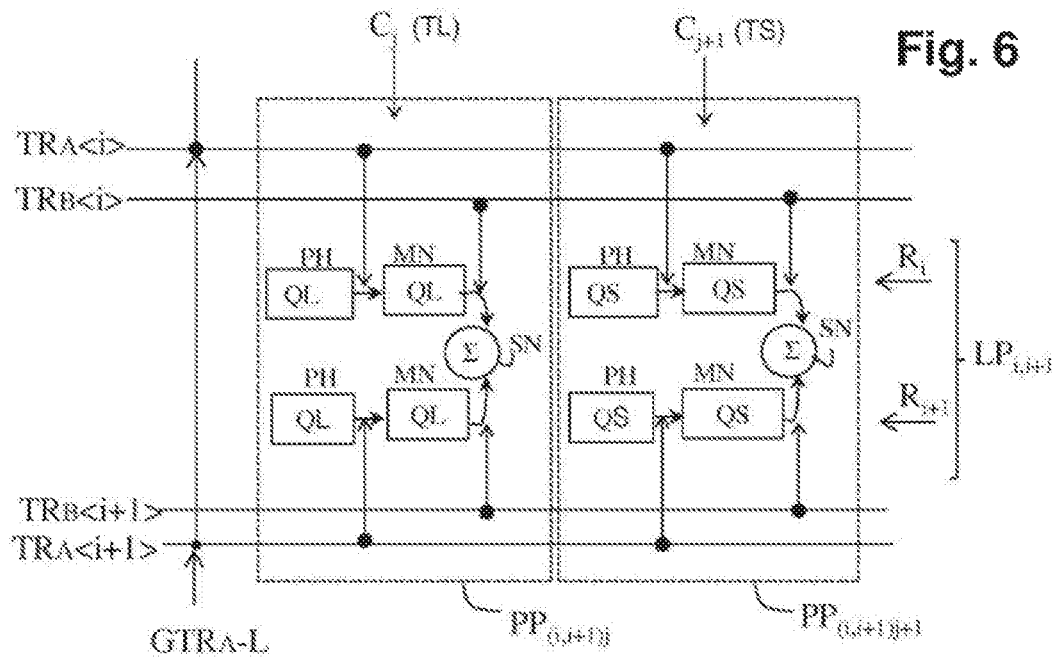
Figure 7:
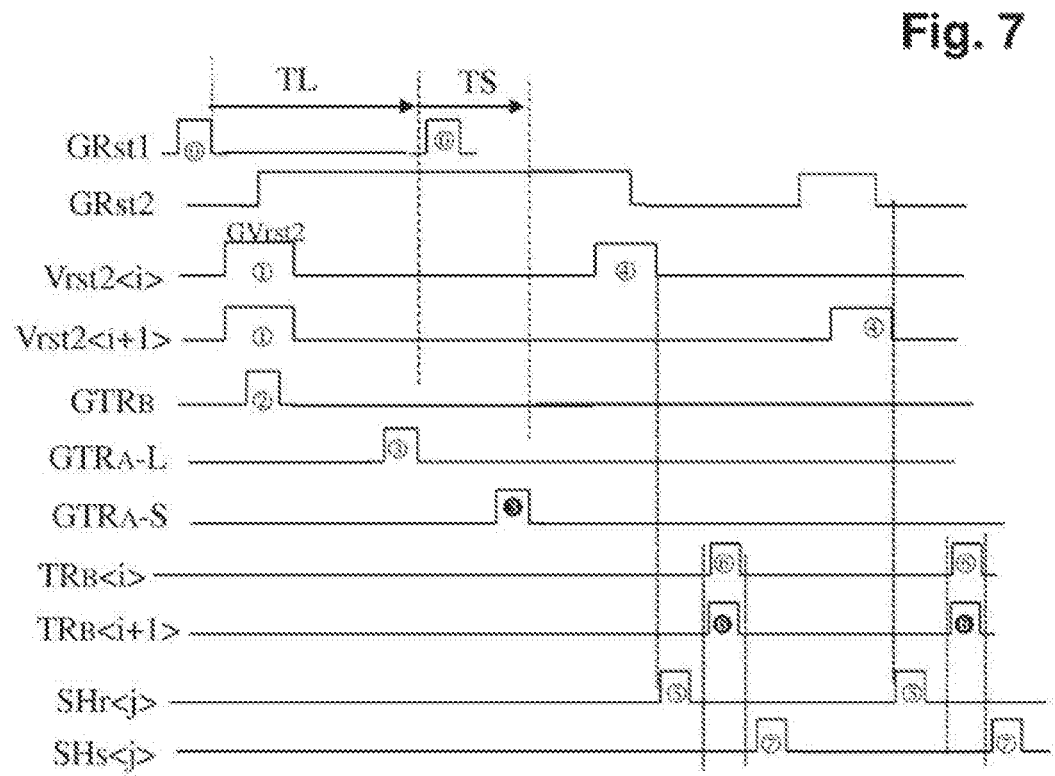
Figure 8:
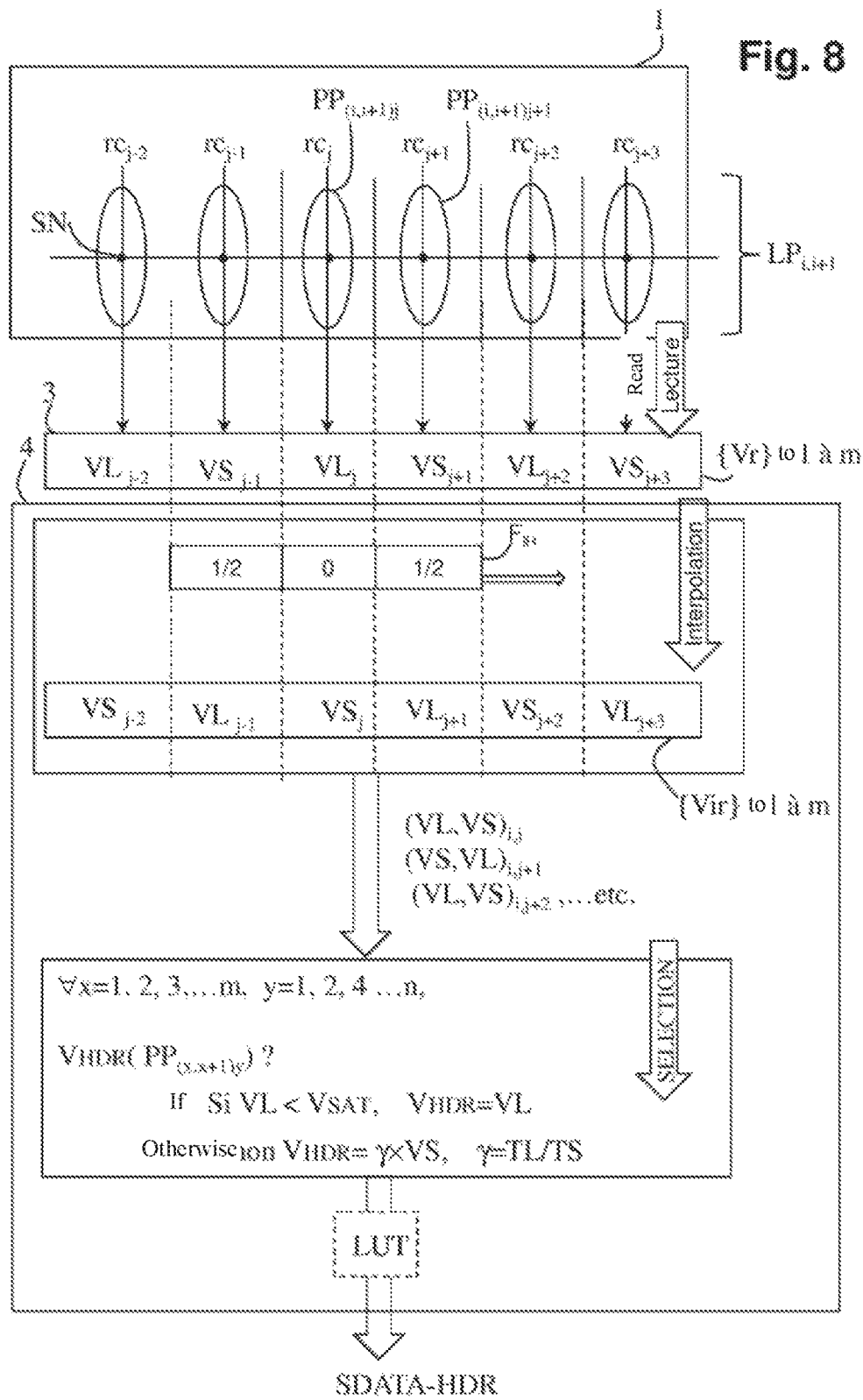
Figure 9:
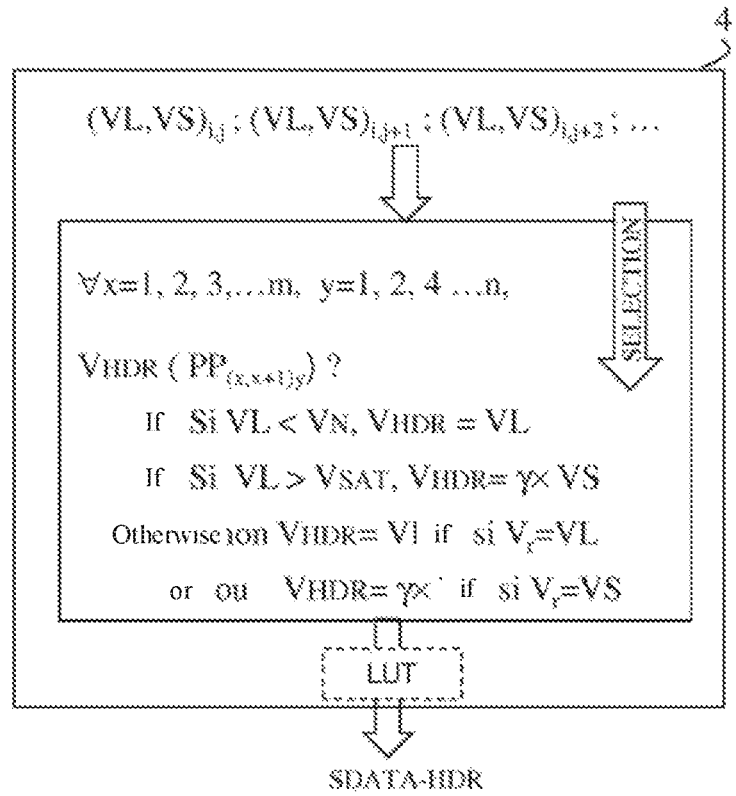
Figure 10:
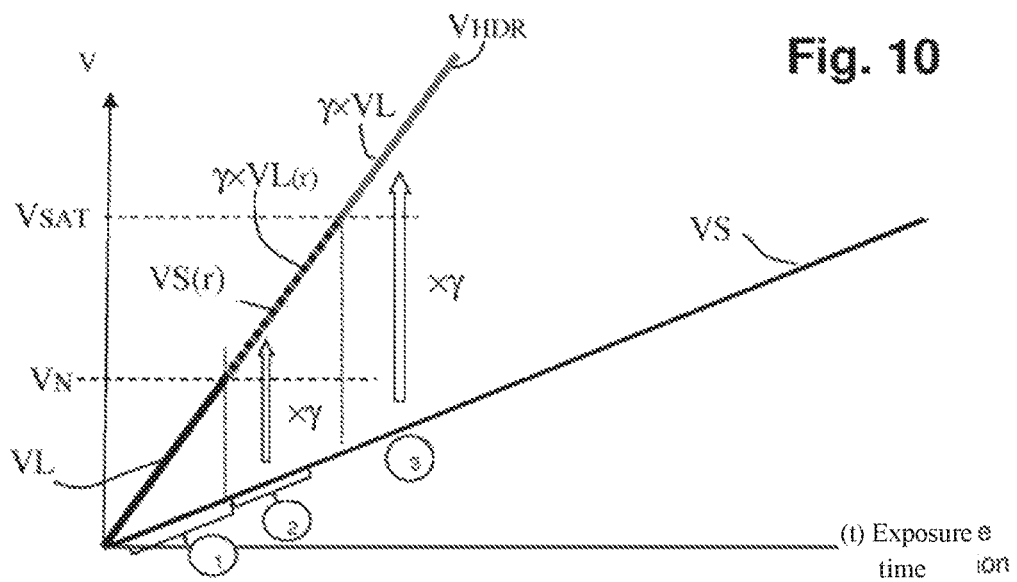
Figure 11:
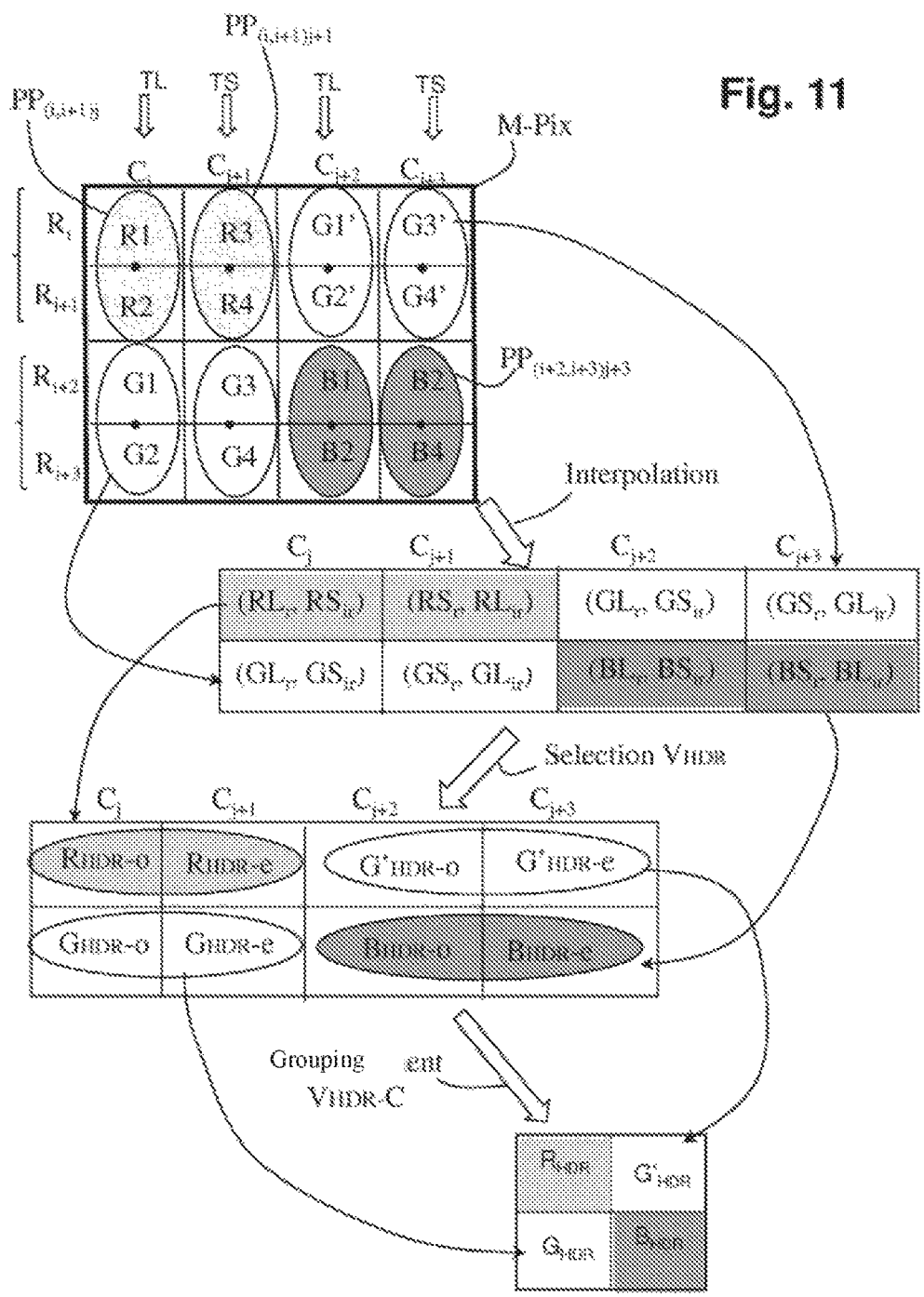

Other features, details and advantages of the invention will become apparent upon reading of the following description made in reference to the drawings which are appended as examples and represent, respectively:

FIG. 1, an overall functional diagram of an image sensor according to the invention;

FIG. 2, an electric wiring diagram of a pair of active pixels with shared read node which can be used in the sensor of FIG. 1;

FIG. 3, a chronogram of pixel control signals for image sensing in normal mode, with an exposure time shared by all the pixels, by an image sensor according to the invention;

FIG. 4, a schematic pixel control diagram for an integration with two integration times in a high-dynamic HDR acquisition mode according to the invention;

FIG. 5, a simplified graph of the integration sequence with two exposure times of the HDR acquisition mode;

FIG. 6, a schematic diagram of the sequence of the phases of the first and second transfers of charges in the vertical pairs of pixels of the HDR acquisition mode;

FIG. 7, a chronogram of the phases of global integration and of sequential reading by pairs of rows of the HDR acquisition mode;

FIG. 8, a functional diagram of the high-dynamic read and reconstruction steps of the HDR mode;

FIG. 9, a diagram illustrating a variant of the high-dynamic reconstruction block;

FIG. 10, a diagram of curves illustrating the dynamic reconstruction principle, in an implementation example according to the diagram of FIG. 9; and FIG. 11, a schematic diagram of high-dynamic reconstruction for a color image sensor with an arrangement of color filters according to the invention.

DETAILED DESCRIPTION

As illustrated in FIG. 1, an image sensor according to the invention includes a matrix 1 of active pixels $P_{i,j}$ arranged in rows R; and columns $C_j$, with i=1 to n j=1 to m, n and m being whole numbers. For a given application, the acquisition of an image can use all the rows and columns of the matrix, or some of the rows and columns corresponding to particular zones of interest. These different uses are conventional and are covered by the present invention. An active pixel is a pixel which includes transistors around the photosensitive element making it possible to control the different phases of integration and reading of the pixel.

The image sensor includes a controller 2 which is configured so as to control the transistors of the active pixels, a read circuit 3 and a digital processing block 4, in such a manner as to carry out the different sequences for integration, reading and shaping of the output flow of image data for each image sensing.

The read circuit 3 comprises one read channel $rc_j$ per column of pixels of the matrix, and the controller 2 drives the phase of reading all or part of the matrix in order to organize the reading of the pixels row by row. The read circuit includes in practice a stage 3a for sampling and analog to digital conversion of the voltages present on the respective read channels. The digital data delivered at the output by a shift register 3b progressively supplies the digital processing block 4 which can apply, different digital processing operations and format the output image data flow SDATA delivered by the sensor. For example, the data can be supplied in the order of reading, by row, and in each row in increasing order of the columns, or it can be supplied by column, and in each column in increasing order of the rows, as a function of the expected format for a given application. These different aspects are well known to the person skilled in the art. The structure of active pixels which is used in the image sensor of the invention has several special features:

it is a structure with separate memory node MN and read node SN, enabling an instantaneous sensing with global shutter, combined with a reading by true double correlated sampling referred to as CDS reading, with a sampling of a reinitialization level of the pixel, and then a sampling of a useful level of the pixel, and the digital data supplied at the output represents the conversion of the difference.

it is a structure with read node SN shared vertically between at least two pixels.

By convention the term "vertical" denotes the direction of a column of the matrix and the term "horizontal" the direction of a row of the matrix. For example, in FIG. 1, if one considers column $C_j$ of rank j, the pixel $P_{i,j}$ in row R; of rank i and the pixel $P_{i+i,j}$ in the row of next rank $L_{i+i}$ share the same read node SN. Below, each pair of the matrix which shares a read node is referred to as a vertical pair of pixels. The notation $PP_{(i,i+i)j}$ denotes the pair on column which is formed by the two pixels of the rows R; and $R_{i+i}$ which share a read node SN.

A structure of pixels having the special features indicated above makes it possible to implement a high-dynamic image sensing mode with global shutter, which is driven by the controller 2, in an optimized manner in terms of control sequence, rate, and resolution, while also optimizing the aspects of compactness and pixel filling ratio.

A sensor having the architecture and the structure of pixels reflected in FIG. 1 makes possible the implementation of image sensing modes with global shutter with:

for the integration phase with global shutter, a way of controlling the exposure times of the pixels as a function of the rank of the columns, which makes it possible to apply:

the same exposure time to all the pixels, corresponding to a normal sensing mode, or two different exposure times as a function of the even or odd rank of the columns, corresponding to a high-dynamic sensing mode.

This control of the exposure times by column is reflected in the architecture of the sensor, as one can see in FIG. 1, by a vertical control row, for each column of the matrix, the effects of which apply to all the pixels of the respective column. The other control rows of the pixels are horizontal control rows, that is to say their effects apply to all the pixels on the respective matrix row.

for the sequential read phase, a read sequence of the vertical pairs of pixels $PP_{(i,i+i)j}$ by pair of successive rows $LP_{i,i+i}$, such that each read node in a pair of rows $LP_{i,i+i}$ is read a single time (per image sensing) by the read channel of the respective column and supplies a measurement of a signal level which represents the contribution of the two pixels which share this read node, for the exposure time of the respective column.

Detailed Example of an Active Pixel Structure

Before describing in further detail the different phases of this high-dynamic sensing mode, we will give a detailed example of a structure of active pixels with shared memory node and read node which is suitable for use in a sensor according to the invention.

The pixel structure which is illustrated in FIG. 2 includes a photodiode PH which is the element of the pixel that is exposed to light, a charge memory node MN also referred to as memory node below, and a read node SN which is shared with at least one pixel on the same column. For the sake of convenience, the invention is illustrated in general and explained for a memory node shared vertically by two successive pixels. The pixel structure in addition includes:

a first reinitialization transistor T1, connected between the photodiode and a voltage source (Vdd in the example), making it possible to selectively reinitialize the photodiode before each new integration phase (image sensing), by evacuation of the charges toward the power source);

a second reinitialization transistor T2 connected to the read node SN, making it possible to selectively reinitialize the read node in the read phase, by evacuation of the charges toward a power source of the transistor;

a first charge transfer transistor TA connected between the photodiode and the memory node MN;

a second charge transfer transistor TB connected between the memory node MN and the read node; and a transistor TF mounted as voltage follower, which makes it possible to apply the voltage to the terminals of the read node SN on the read channel of the column of the pixel, when the row of the pixel is read selected.

In this structure, the read node SN, the second reinitialization transistor T2 and the transistor mounted as voltage follower TF are shared vertically by two successive pixels in the same column. It should be noted that the sharing can occur between two pixels as illustrated, or between more pixels making it possible to improve the compactness of the sensor: the normal or high-dynamic sensing modes which will be described will apply similarly. This structure of FIG. 2 is particularly compact, since it is in fact the read stage of the pixel which is shared.

It would be possible to use a pixel structure with shared node which comprises more transistors without going beyond the principle of the invention. In particular, it should be noted that the structure of FIG. 2 comprises no specific transistor for read selection of a row, since the function of read selection of a row is advantageously ensured by the transistor T2 for reinitialization of the read node, by applying the supply voltage in a pulsed manner to the respective terminal of the transistors T2 of a row of pixels, with an appropriate gate control which makes it possible to actuate the respective follower transistor TF of only the pixels of the row to be read selected. This known mechanism makes it possible to reduce the number of transistors of the pixel. Thus, for each pair of rows of pixels with "shared read stage" there are two horizontal control rows associated with the transistor for reinitialization of the read node of the pixels: the polarization row noted Vrst2 which controls all the polarization electrodes of the transistors T2 and the reinitialization row Rst2 which connects all the gates of the transistors T2. However, the sensor could just as well use a less compact structure which would include an additional transistor in the read stage shared by the two pixels which share their read node, and this transistor would be specific to the read selection. In this case, the polarization electrode of the transistor T2 could continuously receive the supply voltage (Vdd).

For each row R; of pixels of the matrix; one thus has:

a signal row Rst1<i> of photodiode reinitialization (T1);

a signal row TRB<î> of transfer (TB) from the memory node to the read node.

For each pair of rows R; and $R_{i+i}$ grouping the vertical pairs of pixels (vertically sharing their read node); there are two signal rows Rst2<i,i+1> and Vrst2<i,i+1> for the reinitialization of the read node and the read selection.

Thus, as FIG. 1 shows, there are four signal rows per pixel, two of which are shared by two successive rows of pixels. These signal rows extend horizontally like the rows of the matrix.

For each column $C_j$ of pixels, there is a control signal row TRA≥j> of first transfer (TA) which extends vertically; like the column. It is this vertical row topology for the first transfers (PH to MN) that will make it possible, as will be seen below, to control two different exposure times on the even and odd columns in the same global integration phase of the sensor, in a high-dynamic sensing mode according to the invention.

In total, there are 5 control signal rows per pixel, 4 horizontal and 1 vertical, which are driven by the controller 2 to carry out image sensing according to a normal or high-dynamic sensing mode with global shutter.

Below, when the rank of the control row is specified, for example Rstl<i>, this means that the indicated signal applies only to this row. If the rank is not specified, this means that the indicated signal is a "global" signal applied simultaneously to all the control rows in consideration.

Image Sensing with Global Shutter, Normal Mode

A sensing sequence in normal mode is illustrated by the chronogram of FIG. 3. It starts with a phase of global reinitialization of the pixel which starts with the phase of global reinitialization of all the photodiodes: the controller applies the same reinitialization signal Grst1 simultaneously to all the signal rows Rst1 of the matrix. The end of this phase marks the start of the phase of integration by all the pixels simultaneously. The global reinitialization phase continues during the integration, with the phases ① and ② for reinitializing the read node SN and the memory node MN. In practice, the second reinitialization transistor T2 is first activated for all the pixels of the matrix simultaneously (global signal GRst2 applied to all the signal rows Rst2), and then the signal rows Vrst2 simultaneously apply (global signal GVrst2) a reinitialization voltage pulse (Vdd) of determined width Δiï, the time for discharging the read node SN (phase Ⓡ) in all the pixels; during this time Ati, the second transfer transistor TB is also activated in all the pixels of the matrix (global signal GTRB) for a time Aiï, making it possible to reinitialize the memory node MN, via the read node SN (phase ②), and at this time the transistor T2 is actively connected to the reinitialization voltage source.

The integration sequence ends all for the pixels of the matrix with the global transfer control GTRA (phase Ⓡ) applied simultaneously to all the control rows GRA, which causes in each pixel the transfer of the charges integrated by the photodiode during the integration time Tint to the storage node MN of the pixel.

The read sequence of the pixels of the matrix; row by row, starts. The read selection Sel<i> of the pixels of the row R; (phase Ⓡ) is obtained by means of the global activation command of the transistor 12 (Grst2) in all the pixels simultaneously and of the command of a polarization voltage pulse on the transistor T2 of the pixels of the row R; only (Vrst2<i>). The set of the commands Grst2 and Vrst2<i>, in addition to reinitializing the read node of all the pixels, also ensures the maintenance of the read node at a potential below the threshold voltage of the follower transistor, except in the pixels of row R; which one wishes to read, and this has the effect of activating the follower transistor of these pixels: the voltage at the terminals of the read node of the selected pixel is transferred by the follower transistor on the respective read channel. The read phase of the pixels of the row R; thus selected then comprises conventionally, on each read channel $rc_j$, first a sampling of a reinitialization level (SHr<j>—phase Ⓒ), and then a "second" transfer (TRB<î>—phase Ⓒ) of charges from the memory node MN into the read node SN; and a sampling of the corresponding signal level (SHs<j<—phase Ⓡ). The read circuit then supplies at the output the result of the digital conversion of the difference between these two sampled levels. The phases ④ to ⑦ are repeated for each row of pixels to be read.

It is indeed understood that each row of pixels is read as if each pixel had its own read stage, although in the example this stage is structurally shared vertically by two successive pixels. It is understood that the process would be the same if the read stage were shared with more than two successive pixels: each time the read node is reinitialized and the follower transistor of the row is selected again; however, by means of the second transfer control row TRB<î> specific to each row of the matrix, the charges which are transferred into the read node before sampling of the useful level are the charges integrated by the pixel of the row that one wishes to read, Image Sensing with Global Shutter, High-Dynamic Mode A sequence of image sensing by sensing with global shutter in high-dynamic mode by means of a sensor according to the invention is explained here. The basic principles of this sequence in HDR mode are presented in FIGS. 4 and 5.

According to the invention, two different exposure times TL and TS are applied depending on the parity of the rank of the columns, for example, the time TL in the odd columns and the time TS in the even columns. The following conventions are selected: the time TL is longer than the time TS; and the rank j of the column C is odd. Naturally, different conventions could be selected without at all changing the principle of the invention.

The start of integration by the global reinitialization signal of all the photodiodes Grstl, applied simultaneously to all the control rows Rst of the matrix, is controlled.

The end of the integration time is controlled: for TL, by a global first transfer signal GTRA-L applied simultaneously to all the first transfer control rows of only the odd columns (TRA<I>, ..., TRA<j>, ..., TRA<m−1>); for TS, by a global first transfer signal GTRA-S applied simultaneously to all the first transfer control rows of only the even columns TRA<2>, ..., TRA<j+1>, ..., TRA<m>).

In the implementation example, the two times are controlled one after the other, That is to say, after the first integration time TL which is applied to all the pixels; only the charges QL (FIG. 6) integrated by the pixels of the odd column ranks (GTRA-L—phase ③—FIG. 7) are transferred into their respective memory node MN; then, all the photodiodes are reinitialized again (phase ⓐ) and after the second integration time which is applied to all the pixels, only the charges QS (FIG. 6) integrated by the pixels of the even column ranks (GTRA-S—phase Ⓒ—FIG. 7) are transferred into their respective memory node NIN. The chronogram of FIG. 7 shows in more detail this succession of the phases ⓐⓇⒸⓐⒸ of the global integration in HDR mode according to the invention. FIGS. 5 and 7 show exposure times TL and TS applied successively, with, in the example, the longer time applied first. However, the two integrations during the times TL and TS can take place in parallel, and the sequence then includes only one phase Ⓒ of global reinitialization of the photodiodes which sets the common start of the two times TL and TS. In practice, the times TL and TS are multiples of a reference time of the sensor, which is often the row time, on the order of 10 microseconds, or a shorter reference time, on the order of 1 to 2 microseconds, in the more recent sensors.

The chronogram of FIG. 7 shows the detail of the read sequence of the high-dynamic mode according to the invention. In this sequence, the shared read node is used to advantage in order to improve the resolution and the signal depth, by grouping the pixels by vertical pair to carry out an analog summing of the charges integrated by the pixels of a pair in their shared read node, during the second transfer command (TB) by which the charges stored in the memory node are transferred into the read node. Since these second transfers are controlled in a row, the principle, to be explained below, of "HDR" reading by vertical pixel pairs also applies when the read nodes are shared by more than two pixels, for example, by four or six pixels.

The read sequence of the pairs of pixels, by pair of rows of the matrix, starts after the global first transfer commands on the odd columns GTRA-L and on the even columns GTRA-S have been executed. At this time, in each pixel of the matrix, the memory node MN contains the quantity of charges QL or QS integrated by the photodiode of the pixel during the respective exposure time of the pixel, TL or TS, which is defined, as we have seen, by the even or odd rank of the column of the pixel (FIG. 6). Let use assume that the controller is pointing, in the read sequence, to the pair of rows $LP_{i,i+i}$ (FIG. 6). There is one vertical pair of pixels per column. After the reinitialization of the read node in all the pairs $PP_{(i, i+1)j}$ of pixels of the current pair of rows and the selection of the read stage of each pair $PP_{(i,i+13/4}$ via the transistor T2 (phase (D)), the reinitialization level of the read node is sampled in the corresponding read channel $rc_j$ (phase Ⓒ) as in the normal mode. The sequence continues with a second transfer command (MN to SN) in each of the pairs of pixels of the current pair of rows, which is applied to the two pixels in each vertical pair, via the corresponding control rows TRB<î> and TRB<i+1>. These are the phases Ⓒ and Ⓒ (FIG. 7), which are preferably concomitant in order to optimize the read time to the maximum extent. These phases lead to an analog summing of the charges in the read node SN of each vertical pair of pixels, without losses: the quantity of charges in the read node SN of the pair $PP_{(i,i+i)j}$ is equal to $QL+QL_{i+i}$; and the quantity of charges in the read node SN of the pair $PP_{(i, i+1)j}$ is equal to $QS; +QS_{1+i}$.

The useful signal level on each read node is then sampled (phase ⑦) and a corresponding digital value obtained by analog conversion of the difference between the two samples is supplied at the output of the read circuit for each read channel, corresponding to a measurement of the quantity of charges integrated by the pair of pixels in consideration, for the exposure time of the associated column.

Below, this digital value is referred to as first digital value, noted VL or VS depending on whether it is obtained on an odd column applying TL or an even column applying TS. When this value VL or VS is associated with a subscript, the subscript identifies the vertical pair of pixels which supplied the first value, in the current pair of rows (to which the controller points in the read sequence).

The output register 3b of the read circuit supplies at the output a raw data flow which, for each pair of rows of the matrix read successively read in the matrix, is a series of digital data successively supplied by each of the read channels, which starts, for example, by the first digital value supplied by the first column rci, and which ends by the first digital value supplied by the last column rein, and so on for each pair of rows of the matrix.

In comparison to the normal read mode, this mode is twice as fast. In addition, the signal-to-noise ratio is improved due to the analog summing in each pair.

The different read circuits 3 and digital processing circuits 4 being driven and clocked by the controller 2, the digital processing block 4 knows to associate each data item of the digital flow that it receives from the read circuit with the pair of pixels in consideration, by the conventional means of pointers to the rows and the columns.

For example, as illustrated in FIG. 8, in the HDR read sequence for the current pair of rows, $LP_{i,i+i}$, for example, the processing block 4 will receive in succession a set {Vr} of m read values, one per column, and in particular the values $VL_{j-2}$, $VS_{j-i}$, $VL_j$, $VS_{j+i}$, $VL_{j+2}$ and $VS_{j+3}$ for the columns j−2 to j+3 (j being odd, associated with TL).

The controller applies a row interpolation filter $F_{IH}$, "horizontal interpolation," to this set of values {Vr} obtained for the current pair of rows, in order to associate with each value Vr obtained for the exposure time of the column in consideration, another value Vir corresponding to the other exposure time, which is an approximation of what the pair of pixels would have supplied if it had been exposed for this other exposure time. This interpolation calculation is carried out in a few clock ticks, and at the output a data flow is obtained, which includes two values VL and VS per vertical pair of pixels corresponding to the two exposure times TL and TS, one of which is a read value Vr ("first digital value") which corresponds to the real exposure time of the pixels of the pair in consideration, the other of which is an interpolated value Vir ("second digital value") which corresponds to the other exposure time. The size of the filter used is at least 3, corresponding to an averaging filter (FIG. 8), but one can consider using a larger size if one wishes to have more high-frequency details.

The digital processing block 4 is configured to then apply to each pair of pixels a high-dynamic data reconstruction step, by selection by comparison with at least one threshold value representing a saturation value VSAT of the pixels. Indeed, the aim is to select the best value, containing the most information; for each pair of pixels. The comparison loop consists in taking for each pair of pixels the value from the first (read) value and the second (interpolated) value established for the pair of pixels, which is the value VL associated with the longest exposure time TL, in order to compare this value VL with the saturation threshold VSAT. With the chosen convention odd) and for the pairs of pixels of the even columns, this value VL to be compared is the second value, which is interpolated, (Vir); for the pairs of pixels of the odd columns, this value VL is the first value; which is read, (Vr). The digital processing block knows by means of the pointers to select this value VL in each pair of values obtained for the current pair of rows.

If this VL is less than VSAT, then it is the high-dynamic value that is chosen (selected) for the vertical pair of pixels in consideration.

Otherwise, it is the other digital value VS which corresponds to the shortest exposure time that is chosen as high-dynamic value for the vertical pair of pixels in consideration.

Thus, as a function of the sensed image scene and the lighting conditions, for certain pairs of the matrix, it is the value corresponding to the shorter exposure time that is chosen, and for others, it is the value corresponding to the longer exposure time that is chosen. To preserve the linearity of the response, these values have to be put in the same counting scale. If one uses as basis the shorter exposure time TS, when it is the value VL that is chosen by the HDR selection loop, it must be divided by the ratio y=TL/TS. The high-dynamics value established for each pair of pixels is then either VL/γ or VS.

In this scheme of selection by comparison with a single threshold, the value VL is routinely preserved if it is below the threshold VSAT, regardless of whether it was obtained by reading exposure to TL) or by interpolation. Above the threshold; the value VS is used routinely, regardless of whether it was obtained by reading (real exposure to TS) or by interpolation. As a result, there is a loss of fineness of details to be restored: the modulation transfer function FTM is not optimal.

In a variant, the FTM is improved by defining a noise threshold and a saturation threshold such that, between these two thresholds, only the read values corresponding to the real exposure times of pairs are pixels, to the nearest linearization factor γ, are used. This is what is represented in FIG. 9. The two thresholds, of noise VN and of saturation VSAT, are defined with respect to the longest exposure time TL. Whenever the (read or interpolated) value VL of a pair of pixels is between these two thresholds, the HDR, value for this pair of pixels is the read value corresponding to the real exposure time of the pair of pixels in consideration (to the nearest linearization factory). This is zone 2 in FIG. 10. Below the threshold VN (zone 1), the HDR value chosen is the value VL which is a read or interpolated value depending on the rank of the column; above the threshold VSAT (zone 3), the HDR value chosen is the value VS which is a read or interpolated value depending on the rank of the column.

FIG. 10 shows how a high-dynamic data flow VHDR is constructed by comparison of the value VL of each vertical pair of pixels with two thresholds VN and VSAT, based on the scale of measurement of the longer exposure time TL. In this case, when the value VS is chosen by the HDR selection loop, it must be multiplied by the ratio y=TL/TS. The high-dynamic values established for each pair of pixels is then either y.VS or VL.

In this manner, a gain in data depth can be achieved. In FIG. 10, this can be seen with the curve of the values VHDR which extends on the ordinate beyond the saturation threshold VSAT. More precisely, by setting the times TL and TS so that their ratio is a whole number which is a power of two, the data depth is increased by the number of bits which corresponds to the value of the power of two of the ratio γ. For example, if this ratio γ is equal to 2, there is one bit of additional depth. If this ratio is equal to $2^7$, there are 7 bits of additional field depth.

In this case, the digital processing block can be configured so as to apply a correspondence table (LUT) (FIG. 8) coding a compression curve in order to correspond to the data format at the output of the sensor, which in practice corresponds to the maximum coding depth of the analog to digital converter of the sensor. In general, the analog to digital converter codes the image signal over 8, 10 or 12 bits (set by the user), and the output interface of the sensor is thus provided so as to output data coded over 12 bits at the maximum. Let us assume, for a given application, that the converter is parametrized, for image sensing, for coding over 10 bits and that the HDR mode is configured with two times TL and TS which have a ratio TL/TS equal to 4 ($2^2$): then the HDR data at the output; after scaling (γ), is coded over 12 bits (2 additional bits), and the high-dynamic data flow SDATA-HDR formed directly by the VHDR data of the selection step of the digital processing block 4. Even if the ratio γ is greater, this VHDR data is passed through the compression table (LUT). Preferably, the table codes an S-shaped compression curve in order to lose the least information possible. The external system then must have the inverse decompression table in order to recover the entire dynamics (depth) of the data.

Color Processing

All that has been said can apply to a high-dynamics color image sensor, of which the array of colored filters is such that it applies the same filter color to each vertical pair of pixels according to the invention.

If one uses the example of a Bayer filter applied in the conventional manner: one has an alternation of Red (noted R) and Green (noted G) filters on the first row of pixels, and an alteration of Blue (noted B) and Green (noted G) filters on the next row of pixels, defining a periodic pattern RGGB covering 2×2 pixels, and which makes it possible to calculate by demosaicing, a luminance and a chrominance.

In order to benefit from the HDR mode which groups the pixels by vertical pairs sharing a read node, the two pixels of each pair have to be associated with the same color. After HDR reading and reconstruction, four color HDR information items corresponding to RGGB are obtained, each color information item being obtained from one vertical pair of pixels.

However, one can also optimize this high-dynamic color mode by providing, in addition to the vertical grouping by color, a horizontal grouping by color. The vertical grouping corresponds to the analog summing in the read node explained above.

The horizontal grouping corresponds to a digital summing of the HDR values of two neighboring vertical pairs of pixels "of the same color."

FIG. 11 makes it possible to explain the different aspects of this color improvement. For the explanation, as an example, a Bayer filter applying a pattern of 4 colored filters to each block of 2×2 pixels of a matrix, 1 red and 1 green on one row and one green and one blue on the other row, is considered.

According to the invention, in a pixel matrix of an image sensor, which has the functional architecture and the pixel structure of FIG. 1, a color macro-pixel M-Pix is defined, which is a block of 4 blocks of 2×2 pixels covering 4 consecutive rows and 4 consecutive columns, and one color of the four Bayer filter colors is associated with each of the four blocks of pixels. It is as if a Bayer super filter were defined, wherein each colored filter would cover one block of 2×2 pixels.

In other words: each pixel is associated with a colored filter; each block defines two vertical pairs of pixels, the pixels of which are associated with the same colored filter color; and the periodic pattern of colored filters applied to the matrix covers four blocks of pixels corresponding to two pairs of successive rows and four successive columns.

This macro-pixel contains for each color two respective vertical pairs of pixels which are aligned horizontally: one pair of pixels is associated with an odd column exposed for the associated time, TL in the example, and the other pair is associated with an even column exposed for the associated time, IS in the example.

After reading in HDR mode, and then interpolation by the digital processing block 4 as explained above (FIG. 8), one obtains, for each pair, a read value (index r) and an interpolated value (index ir), one corresponding to the longer exposure time TL and the other to the shorter exposure time TS (depending on the rank of the column) in the "color" of the pixels of the pair. That is to say, for example, if one considers the two "Red" vertical pairs, the first pair $PP_{(i,i+i)j}$ being formed by the red pixels R1 and R2, and the second pair $PP_{(i,i+1)j+1}$ being formed by the green pixels R3 and R4. For the first pair (R1, R2), the "red" value which is read is $RL_r$ for the exposure time TL of the respective column $C_j$, and the interpolated value is $RS_r$ for the other time TS. For the second pair (R3, R4) which is exposed for the exposure time TS, the read value is $RS_r$ and the interpolated value is $RL_{ir}$.

After the HDR reconstruction step by selection of a value from the two values, the read value and the interpolated value, of each vertical pair of pixels (relative to one or two thresholds as explained above) and scaling if applicable (factor γ), one obtains one HDR color value per pair of colored pixels. For example, for the two red vertical pairs of the color macro pixel of FIG. 11, one obtains a value RHDR-O for the first pair (R1, R2) located in a column of odd rank ("o" as in "odd") and a value RIDR-e for the second pair (R3, R4) located in the next column of even rank ("e" for "even").

According to the invention, the digital processing block 4 is configured so as to add these two values RHDR-O and RHDR-e in order to supply the corresponding HDR color value RHDR. That is to say, to each color macro-pixel M-PIX correspond, at the output, 4 high-dynamic color information items, one per color of the filter, obtained by vertical grouping in the read phase (analog summing), and then horizontal HDR grouping VHDR-C, after HDR reconstruction by selection (and scaling) applied to each pair in the processing phase (by the processing block 4).

The color data flow at the output is compatible with the conventional color processing algorithms (demosaicing) associated with color filters of dimension 2×2, four colors. The color image sensor configured so as to be used in HDR mode according to the invention has the following advantages indicated above: improvement of this transfer time in a ratio of 2 (one reading by pairs of rows); reduced output transmission time (one HDR output color data item per block of 4 pixels) inducing a digital processing cost such as reduced white balance adjustment (less memory and reduced processing time); better signal-to-noise ratio (analog summing in each pair). Another advantage is that this HDR mode is run without alteration of the field of vision of the sensor.

A color image sensor defined with a color filter corresponding to a macro-pixel structure according to the invention makes possible a color HDR reconstruction which is optimized both in terms of compactness and in terms of transfer, transmission and processing time. The color filter can use combinations of colors other than those (red, green, blue) defined by the Bayer filter, as is known in the prior art.

It should be noted that the described color HDR reconstruction combining a vertical grouping for reading and a horizontal grouping of the reconstructed high-dynamic data can also be applied to an image sensor without color filtering, in particular in order to benefit the degree of reduction of data flow at the output (1 data item per 4 pixels).

The invention claimed is:

1. An image sensor with active pixels including:
    a matrix of pixels arranged in rows and columns, wherein the rows define a horizontal alignment of pixels and the columns define a vertical alignment of pixels;
    a read circuit comprising one separate read channel per column of pixels and configured so as to establish by analog to digital conversion a digital value representative of the quantity of charges integrated by a pixel during an exposure time of the pixel, and to successively supply at the output said digital values established in each read channel for each row of the matrix;
    a digital processing block configured so as to apply digital processing operations to said digital values supplied at the output by the read circuit;
    and
    the structure of the pixels being such that each pixel comprises:
        a photodiode, a memory node and a read node, and
        a first photodiode reinitialization transistor configured so as to selectively reinitialize the photodiode,
        a second read node reinitialization transistor configured so as to selectively reinitialize the read node,
        a first transfer transistor for selectively authorizing the transfer of the electrical charges integrated by the photodiode, into the memory node,
        a second transfer transistor for selectively authorizing the transfer of charges stored in the memory node, into the read node,
        a transistor mounted as voltage follower and configured so as to selectively apply the voltage to the terminals of the read node on the read channel of the column of the pixel, when the row of the pixel is read selected,
    wherein:
        in each column of pixels, the read node, the read node reinitialization transistor and the transistor mounted as voltage follower are shared vertically by at least two successive pixels in the column,
        the first and second reinitialization transistors and the second transfer transistor are each driven by a respective control signal shared by all the pixels of a given row, and the first transfer transistor is driven by a control signal shared by all the pixels of a given column of pixels; and
    the sensor also including a controller configured so as to drive the transistors of the pixels, the read circuit and the digital processing block so as to control image sensing with global shutter in high-dynamic mode comprising:
        an integration phase with global shutter including
        a global exposure of the pixels of the odd columns during a first integration time which starts after a global reinitialization of the photodiodes of the matrix and which ends simultaneously for all the pixels of the odd columns, with a first global transfer of charges from the photodiodes to the memory mode of said pixels; and
        a global exposure of the pixels of the even columns during a second integration time different from the first one, which starts after a global reinitialization of the photodiodes of the matrix and which ends simultaneously for all the pixels of the even columns, with a first global transfer of charges from the photodiode to the memory node of said pixels, and then
        a sequential read phase, by pair of rows, the pixels of a pair of rows located on a given column forming, in pairs, a vertical pair of pixels with shared read node, and said read phase is such that a read sequence of a pair of rows includes for each vertical pair of pixels the steps of:
    establishing a first digital value by the read circuit, which is a measure of the analog sum of the charges integrated by each of the pixels of said vertical pair of pixels during the exposure time of the respective column, then
    establishing a second digital value WO corresponding to the other exposure time, by horizontal interpolation by the digital processing block of first digital values established in the read sequence of the current pair of rows, for at least two vertical pairs of pixels on neighboring columns, on both sides of the column of the vertical pair of pixels in consideration, wherein said neighboring columns are associated with said other exposure time, and establishing a high-dynamic output value for said vertical pair of pixels from said first digital value, which is read, and said second digital value, which is interpolated, by comparison with at least one first threshold.

2. The image sensor according to claim 1, wherein the digital processing block is configured so as to apply an additional operation of horizontal grouping of data in each pair of rows in order to form a high-dynamic image data flow at the output of the sensor, said additional operation establishing for each pair of rows one high-dynamic output value per block of two successive vertical pairs of pixels of the pair of rows, said high-dynamic value being based on a digital addition of the two high-dynamic values of the two vertical pairs of pixels of the block.

3. The image sensor according to claim 1, wherein the digital processing block is configured so as to establish the high-dynamic value of each vertical pair of pixels by comparison with a first threshold such that when the digital value among said first and second digital values which corresponds to the longest exposure time is less than the first threshold, it is the digital value used to establish the high-dynamic output value, otherwise, the other digital value which corresponds to the shortest exposure time is used to establish the high-dynamic output value.

4. The image sensor according to claim 1, wherein the digital processing block is configured so as to establish the high-dynamic value of each vertical pair of pixels by comparison with a first threshold and a second threshold, such that when the digital value among said first and second digital values which corresponds to the longest time is less than the first threshold, it is the value used to establish the high-dynamic output value, when said digital value is between the first and the second thresholds, the digital value used to establish the high-dynamic output value is the first digital value, when the said digital value is greater than the second threshold, the digital value used to establish the high-dynamic output value is the one which corresponds to the shortest exposure time.

5. The image sensor according to claim 1, wherein the digital processing block is configured so as to establish the high-dynamic output value of each pair in a scale which is the scale associated with the longest exposure time, so that when the digital value used to establish the high-dynamic digital value of the pair of pixels in consideration corresponds to the shortest exposure time, said value is multiplied by the ratio of the longer exposure time to the shorter exposure time.

6. The image sensor according to claim 5, wherein said ratio is a whole number which is a power of two.

7. The image sensor according to claim 6, wherein the digital processing block applies a compression to said high-dynamic values when the ratio between the two exposure times is such that the depth in number of bits of the high-dynamic values exceeds an output format of the data of the sensor.

8. The image sensor according to claim 1, comprising an array of color filters, such that the two pixels of each vertical pair of pixels are associated with the same colored filter color.

9. The image sensor according to claim 8, defining a color macro-pixel which is a block of 4 blocks of 2×2 pixels, covering 4 consecutive rows and 4 consecutive columns, each block forming two vertical pairs of pixels, and said macro-pixel being associated with a periodic pattern of 4 colored filters, with one block per filter color of the pattern.

10. The image sensor according to claim 1, wherein the controller is configured so as to drive a single global reinitialization of photodiodes establishing the start of said first and second exposure times, and said global exposures of the even and odd columns start at the same time for all the pixels.

11. The image sensor according to claim 1, wherein the controller is configured so as to control a first global reinitialization of the photodiodes establishing the start of said first integration time, and then, after the end of the first integration time, a second global reinitialization of photodiodes establishing the start of said second integration time.

12. The image sensor according to claim 1, wherein each phase of integration includes, after said global reinitialization of the photodiodes, a global reinitialization of the read nodes, and in the time of said global reinitialization of the read nodes, a global reinitialization of the memory nodes via the global activation of the second transfer transistors.

13. The image sensor according to claim 1, wherein the read selection for a pair of rows is obtained by the second reinitialization transistor of the pixels, the controller being configured so as to selectively activate said transistor in correspondence with a selective switching of a reinitialization voltage pulse on a polarization electrode of said transistor.

* * * * *